March 4, 1958 A. M. CLOGSTON 2,825,759
MAGNETICALLY LOADED ANISOTROPIC TRANSMITTING MEDIUM
Filed June 29, 1951 2 Sheets-Sheet 1

INVENTOR
A. M. CLOGSTON
BY
ATTORNEY

March 4, 1958  A. M. CLOGSTON  2,825,759
MAGNETICALLY LOADED ANISOTROPIC TRANSMITTING MEDIUM
Filed June 29, 1951  2 Sheets-Sheet 2

INVENTOR
A. M. CLOGSTON
BY
Hugh S. Wertz
ATTORNEY

Ur ited States Patent Office 2,825,759
Patented Mar. 4, 1958

2,825,759

MAGNETICALLY LOADED ANISOTROPIC
TRANSMITTING MEDIUM

Albert M. Clogston, Morris Plains, N. J., assignor to Bell
 Telephone Laboratories, Incorporated, New York,
 N. Y., a corporation of New York Application June 29, 1951, Serial No. 234,349

4 Claims. (Cl. 178—45)

This invention relates to electrical conductors and more specifically to composite conductors formed of a multiplicity of insulated conducting portions.

It is an object of this invention to improve the current distribution in conductors of the type comprising a large number of insulated conducting portions, and particularly to effect such improvements by magnetic loading.

In a copending application of the present inventor, Serial No. 214,393, filed March 7, 1951, and which issued on October 30, 1956, as Patent 2,769,148, there are disclosed a number of composite conductors, each of which comprises a multiplicity of insulated conducting elements of such number, dimensions, and disposition relative to each other and to the orientation of the electromagnetic wave being propagated therein as to achieve a more favorable distribution of current and field within the conducting material. In one specific embodiment disclosed in Figs. 7A and 7B of the Clogston application, two coaxially arranged composite conductors are separated by a dielectric material, each of the composite conductors comprising a multiplicity of thin metal laminations insulated from one another by layers of insulating material, the smallest thickness of each of the laminations being in the direction perpendicular to both the direction of wave propagation and the magnetic vector. Each metal lamination is many times (for example 10, 100 or even 1000 times) smaller than the factor $\delta$ which is called one skin thickness or one skin depth. The distance $\delta$ is given by the expression $$\sqrt{\frac{1}{\pi f \mu \sigma}} \qquad (1)$$

where $\delta$ is expressed in meters, $f$ is the frequency in cycles per second, $\mu$ is the permeability of the metal in henries per meter and $\sigma$ is the conductivity in mhos per meter. The factor $\delta$ measures the distance in which the current and field penetrating into a slab of the metal many times $\delta$ in thickness will decrease by one neper; i. e., their amplitude will become equal to $$\frac{1}{e} = 0.3679, \cdots$$

times their amplitude at the surface of the slab.

It is pointed out in the above-identified copending application that when a conductor has such a laminated structure, a wave propagating along the conductor at a velocity in the neighborhood of a certain critical value will penetrate further into the conductor (or completely through it) than it would penetrate into a solid conductor of the same material, resulting in a more uniform current distribution in the laminated conductor and consequently lower losses. The critical velocity for the type of structure just described is determined by the thickness of the metal and insulating laminae and the dielectric constant of the insulating laminae in the composite conductors. The critical velocity can be maintained by making the dielectric constant of the main dielectric, that is, the dielectric material between the two composite conductors, equal to $$\epsilon_1 = \epsilon_2 \left( 1 + \frac{W}{t} \right) \qquad (2)$$

where $\epsilon_1$ is the dielectric constant of the main dielectric element between the two composite conductors in farads per meter, $\epsilon_2$ is the dielectric constant of the insulating material between the laminae of the conductors in farads per meter, $W$ is the thickness of one of the metal laminae in meters, and $t$ is the thickness of an insulating lamina in meters. The insulating laminae are also made very thin, and an optimum thickness for certain structures of this general type is that in which each insulating lamina is one-half the thickness of a metal lamina.

The present invention relates to improvements in composite structures of the type just described and in other related structures, such as, for example, the composite conductors in Figs. 17A and 18A of the above-identified copending application and also many others described in that application.

In accordance with the present invention, structures are provided comprising composite conductors of the type above described except that the composite conductor includes additional, magnetic elements. If these magnetic elements have transverse dimensions small compared to their appropriate skin depth there will again be critical velocities at which the waves penetrate deeply into these three-element stacks with the same advantages as before. The particular advantage of including the magnetic elements is that they raise the intrinsic impedance of the stack. Thus if the stack fills all or a substantial fraction of the region through which the wave is travelling the impedance of the system will be increased and the losses reduced.

In one specific illustrative embodiment of the present invention, a composite conductor is provided comprising two laminated concentric conductors separated by a main dielectric member, each of the composite conductors consisting of a multiplicity of laminations of conducting material separated by laminations of insulating material and laminations of magnetic material. In another embodiment, all of the space between a coaxially arranged outer sheath and an inner core is filled with laminations of conducting material spaced from one another by laminations of insulating material and laminations of magnetic material. In still another embodiment, the space between a central core and an outer sheath is filled with a multiplicity of filaments of conducting material and a multiplicity of filaments of magnetic material, the filaments being spaced from one another by insulating material. Various modifications of these typical embodiments also constitute a part of the present invention.

The invention will be more readily understood by referring to the following description taken in connection with the accompanying drawings forming a part thereof, in which:

Fig. 1 is an end view of a coaxial composite conductor in accordance with the invention, the outer conductor comprising a multiplicity of laminations of conducting material separated by laminations of insulating material and laminations of magnetic material and the inner conductor being similar in this respect to the outer conductor, the space between these two conductors being filled with a dielectric member;

Figure 2:
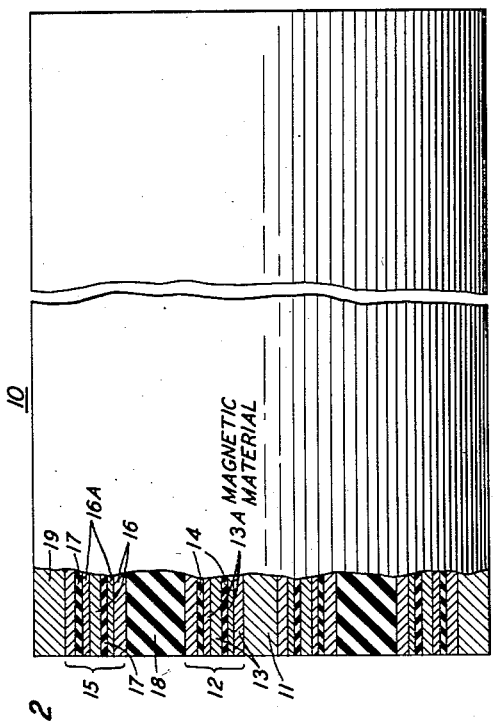
Fig. 2 is a longitudinal view, with portions broken away, of the composite conductor of Fig. 1.
Figure 1:
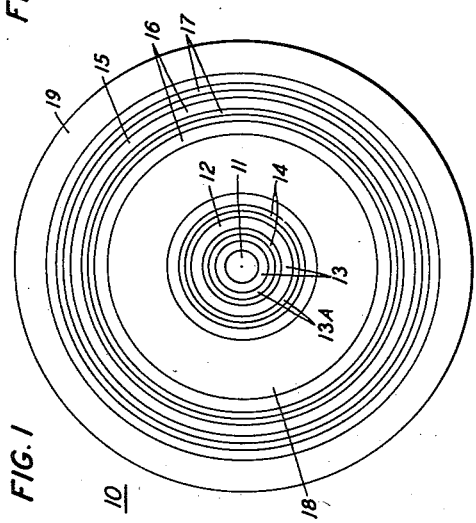

Referring more particularly to the drawings, Figs. 1 and 2 show, by way of example, a conductor 10 in accordance with the invention, Fig. 1 being an end view and Fig. 2 being a longitudinal view. The conductor 10 comprises a central core 11 (which may be either of metal or dielectric material), an inner conductor 12 formed of many laminations of conducting material 13 spaced by laminations of magnetic material 13A and of laminations of insulating material 14, an outer conductor 15 formed of a multiplicity of laminations of conducting material 16 spaced by laminations of magnetic material 16A and of laminations of insulating material 17 and separated from the inner conductor 12 by a dielectric member 18, and an outer sheath 19 of metal or other suitable shielding material.

As disclosed in the above-mentioned Clogston application, each of the conducting layers 13 and 16 is thin compared to its appropriate skin depth. Furthermore each of the magnetic layers 13A and 16A is thin in comparison with its appropriate skin depth. The insulating layers are also preferably but not necessarily of comparable thinness with the conducting and magnetic layers. Examples of satisfactory materials are: conductors—copper, silver, aluminum or any other good conductor; insulators—polystyrene or any other good insulator (the dielectric constant is not critical, as in the insulators of the corresponding structure in the above-mentioned Clogston application); and magnetic material—any material of high permeability (it need not be a good conductor) such as iron, permendur or a ferrite, for example. (Ferrites and their properties are described in an article entitled "Ferrites: New magnetic materials for communication engineering," by V. E. Legg in the May 1951 number of the Bell Laboratories Record at page 203.)

The inner conductor 12 has 10 or 100 or more conducting layers 13 and the other conductor 15 has a somewhat similar number of conducting layers 16, although there need not be exactly the same number of conductors as in the inner conductor 12. Since there are a large number of insulating, conducting, and magnetic layers, it makes no difference whether the first or the last layer in each stack (12 or 13) is of conducting, magnetic or insulating material.

Assume that the structure is laminated as in Figs. 1 and 2 and that the thickness of each of the insulating laminae is $t$ meters and their dielectric constant is $\epsilon_2$ farads per meter, that the thickness of each of the magnetic conducting lamina is $h$ meters, its permeability $\mu$ henries per meter and its conductivity is $\sigma$ mhos per meter, and that the thickness of each conducting lamina is $W$ meters. As the laminae in the structure of Figs. 1 and 2 do not completely fill the region of transmission the remaining space is filled with the insulator 18 of dielectric constant $\epsilon_1$ given by the expression $$\epsilon_1 = \epsilon_2 \left( \frac{W+t}{t} + \frac{\mu}{\mu_0} \frac{h}{t} \right) \frac{\text{farads}}{\text{meter}} \quad (3)$$

where $\mu_0$ is the permeability of free space in henries per meter. If $\mu = \mu_0$ this equation becomes equivalent to Equation 2 above. If the laminae are thin enough the optimum proportions are for the dielectric and magnetic materials to be of equal thickness and one half the thickness of the conducting laminae, provided $$\frac{\mu}{\mu_0}$$

is sufficiently larger than unity. By proper selection of material the velocity of propagation of the electromagnetic wave along the conductor is made appropriate to the average transverse dielectric constant and average transverse permeability of the composite conductors. Under these conditions the currents and the electromagnetic wave itself penetrate deeply within the composite conductor, thus greatly reducing the skin effect losses and producing a more uniform current distribution.

Figure 4:
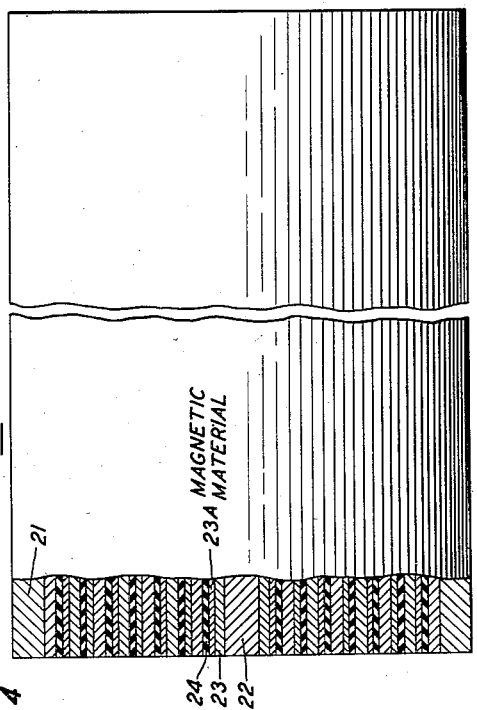
Fig. 4 is a longitudinal view, with portions broken away, of the arrangement of Fig. 3.
Figure 3:
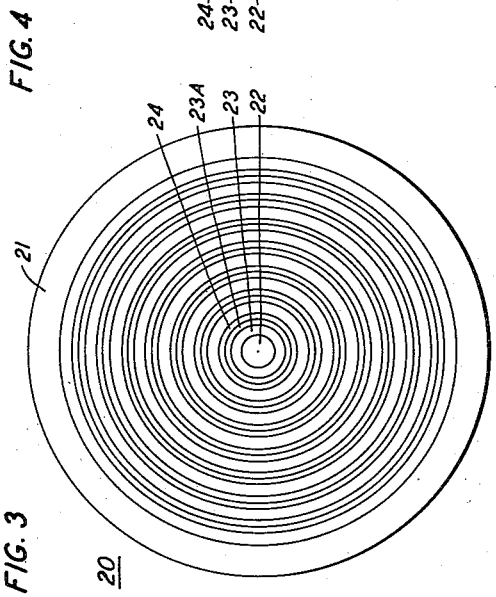
Fig. 3 is an end view of another form of coaxial conductor in accordance with the invention, in which all of the space between an outer sheath and an inner core is filled with laminations of conducting material spaced from one another by laminations of insulating material and laminations of magnetic material.

In the arrangement of Figs. 1 and 2, special means have been provided to assure the proper velocity of propagation of the electromagnetic wave along the system. Within the conductor the wave has an intrinsic velocity of propagation just appropriate to the average transverse dielectric constant and average transverse permeability. Thus, if the region within which the electromagnetic wave to be propagated is completely filled with the composite conductor, the condition on the velocities is automatically fulfilled. Figs. 3 and 4 illustrate a coaxial transmission line 20 constructed in accordance with this principle (as is also the arrangement of Fig. 17A in the above-identified Clogston application).

In the arrangement of Figs. 3 and 4, the entire region between the sheath 21 and the core 22 (which may be either of solid or tubular metal, either magnetic or non-magnetic, or of dielectric material) is filled with alternately positioned layers of conducting material 23, magnetic material 23A, and insulating material 24 respectively. As in the arrangement of Figs. 1 and 2, each of the conducting laminae 23 is made thin in comparison with its appropriate skin depth and this is also true of the magnetic laminations 23A. The insulating layers 24 are also preferably but not necessarily of comparable thinness with the conducting and magnetic layers. The material of the respective laminations 23, 23A and 24 can be similar to those of the corresponding laminations in the stacks 12 and 15.

Figure 6:
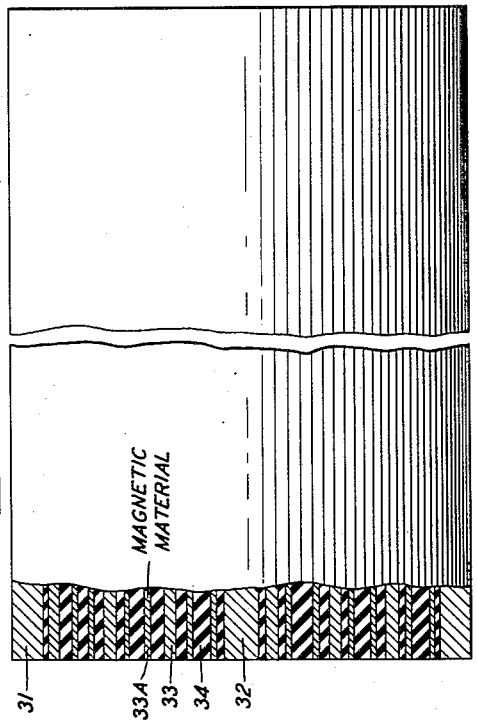
Fig. 6 is a longitudinal view, with portions broken away, of the arrangement of Fig. 5.
Figure 5:
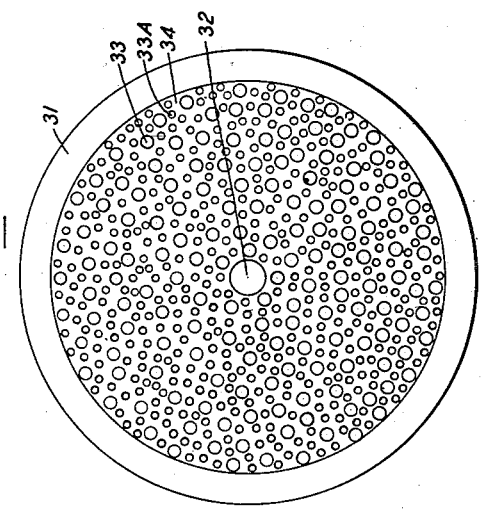
Fig. 5 is an end view of another embodiment of the invention in which the space between a central core and an outer sheath is filled with a multiplicity of filaments of conducting material and filaments of magnetic material, the filaments being spaced from one another by insulating material.

Figs. 5 and 6 illustrate a third embodiment of the invention, Fig. 5 being an end view and Fig. 6 being a longitudinal view. The composite conductor 30 shown in these figures comprises an outer shield 31 of any suitable shielding material, an inner core 32 of conducting material, either magnetic or non-magnetic, or of dielectric material, and the space therebetween is filled with a multiplicity of conducting filaments 33 and filaments of magnetic material 33A separated by insulating material 34. Each of the filaments 33 and 33A has a cross-section which is small compared with its appropriate skin depth as in the laminated structures described above. The magnetic material of the filaments 33A may be iron or permendur or some ferrite material while the insulating material 34 may be polystyrene or any other suitable material. The filaments 33 maintain the same relative cross-sectional or radial position along the composite conductor 30; that is, there is no necessity to transpose them in order to produce the current or field distribution desired. As in the preceding structures, the effect of the magnetic elements 33A is to increase the permeability of the composite structure and thus raise the composite impedance and reduce the conduction losses. The filaments 33 and 33A may be of the same diameter but in some cases it is preferable to make the conducting filaments 33 approximately twice the diameter of the magnetic filaments 33A.

Figure 7:
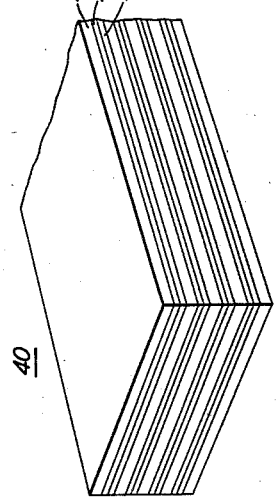
Fig. 7 is a perspective view of a "stack" in accordance with the invention formed of alternate layers of conducting material, insulating material, and magnetic material.

In Fig. 7 there is shown in perspective a laminated conductor 40 comprising a stack of alternately disposed conducting layers 41, magnetic layers 42 and insulating layers 43 which may be of the same material as the corresponding elements in the structure shown in Figs. 3 and 4 above.

It should be readily apparent that the invention is not restricted to the specific forms of composite conductors shown, as the invention is obviously applicable to other elements disclosed in the above-mentioned Clogston application; and moreover many other modifications of the embodiments disclosed can be made without departing from the scope of the invention as indicated in the claims.

What is claimed is:

1. In an electromagnetic wave guiding system, a conducting medium comprising a multiplicity of elongated conducting portions spaced by means including insulating material and magnetic material separate from said insulating material, and means for launching high frequency electromagnetic waves in said system, the conducting portions and insulating and magnetic material being in the form of laminations alternately of non-magnetic conducting, non-magnetic dielectric, and magnetic materials, there being a sufficient number of conducting portions to carry a substantial portion of the current induced by said waves, and each of said conducting laminations having at least one dimension in a direction substantially transverse to the direction of wave propagation down the length thereof which is small compared with its appropriate skin depth at the highest frequency of operation with said high frequency waves, whereby the said conducting medium is substantially penetrated by the electric field of said waves.

2. In an electromagnetic wave guiding system comprising an inner core member and an outer shell coaxially arranged therewith, a conducting medium between the core and the shell, said conducting medium comprising a multiplicity of laminations alternately of non-magnetic conducting, non-magnetic dielectric, and magnetic materials, and means for launching high frequency electromagnetic waves in said system, there being a sufficient number of conducting laminations to carry a substantial portion of the current induced by said waves, and each of said conducting laminations having at least one dimension in a direction substantially transverse to the direction of wave propagation down the length thereof which is small compared with its appropriate skin depth at the highest frequency of operation with said high frequency waves, whereby the said conducting medium is substantially penetrated by the electric field of said waves.

3. The combination of elements as claimed in claim 2 in which said conducting, dielectric and magnetic laminations are arranged in the form of two stacks separated by an insulating member.

4. The combination of elements as claimed in claim 3 in which said stacks are coaxially arranged with respect to each other and said inner core and said outer shell.

References Cited in the file of this patent

UNITED STATES PATENTS

| | | |
|---|---|---|
| 1,701,278 | Silbermann | Feb. 5, 1929 |
| 1,903,975 | Buckley | Apr. 18, 1933 |
| 1,996,186 | Affel | Apr. 2, 1935 |
| 2,008,286 | Leib | July 16, 1935 |
| 2,228,798 | Wassermann | Jan. 14, 1941 |
| 2,433,181 | White | Dec. 23, 1947 |
| 2,511,610 | Wheeler | June 13, 1950 |
| 2,576,163 | Weston | Nov. 27, 1951 |
| 2,769,148 | Clogston | Oct. 30, 1956 |
| 2,777,896 | Black | Jan. 15, 1957 |

FOREIGN PATENTS

| | | |
|---|---|---|
| 458,505 | Great Britain | Dec. 17, 1936 |